(12) United States Patent
Kazansky

(10) Patent No.: US 10,733,799 B2
(45) Date of Patent: Aug. 4, 2020

(54) AUGMENTED REALITY SENSOR

(71) Applicant: DAQRI, LLC, Los Angeles, CA (US)

(72) Inventor: Lucas Kazansky, Los Angeles, CA (US)

(73) Assignee: DAQRI, LLC, Los Angeles, CA (US)

( * ) Notice: Subject to any disclaimer, the term of this patent is extended or adjusted under 35 U.S.C. 154(b) by 0 days.

(21) Appl. No.: 15/660,642

(22) Filed: Jul. 26, 2017

(65) Prior Publication Data

US 2019/0035152 A1 Jan. 31, 2019

(51) Int. Cl.
*G06T 19/00* (2011.01)
*H04L 29/06* (2006.01)
*H04L 29/08* (2006.01)
*G06F 16/25* (2019.01)

(52) U.S. Cl.
CPC .......... *G06T 19/006* (2013.01); *G06F 16/252* (2019.01); *H04L 67/18* (2013.01); *H04L 67/42* (2013.01)

(58) Field of Classification Search
CPC .......... B60K 2350/1072; G06T 19/006; G06T 2215/16; G06T 7/70; G06F 3/0482; G06F 3/04847; G06F 9/451
USPC ........................................................ 345/633
See application file for complete search history.

(56) References Cited

U.S. PATENT DOCUMENTS

| | | | | |
|---|---|---|---|---|
| 2013/0144482 A1* | 6/2013 | Tuukkanen | ........... | G06F 3/0482 701/29.6 |
| 2015/0187138 A1* | 7/2015 | Mullins | .................. | G06T 19/006 345/633 |
| 2016/0049005 A1* | 2/2016 | Mullins | .................. | G06T 19/006 345/420 |
| 2016/0049007 A1* | 2/2016 | Mullins | .................. | G06T 19/006 345/419 |
| 2016/0054791 A1* | 2/2016 | Mullins | .................. | G04G 21/00 345/173 |
| 2016/0189397 A1* | 6/2016 | Mullins | ...................... | G06T 7/90 345/633 |
| 2016/0247324 A1* | 8/2016 | Mullins | .................... | G06F 3/012 |
| 2017/0092220 A1* | 3/2017 | Mullins | .................. | G09G 5/003 |
| 2017/0228935 A1* | 8/2017 | Foster | .................... | H04W 4/023 |
| 2017/0255450 A1* | 9/2017 | Mullins | .................... | G06F 8/315 |
| 2018/0053055 A1* | 2/2018 | Finding | ............. | G06K 9/00671 |
| 2018/0158244 A1* | 6/2018 | Ybanez Zepeda | ...... | G06F 3/017 |
| 2018/0174366 A1* | 6/2018 | Nishibe | ............... | G06F 3/04842 |
| 2018/0261012 A1* | 9/2018 | Mullins | .................... | H04L 67/22 |

(Continued)

*Primary Examiner* — Jin Cheng Wang
(74) *Attorney, Agent, or Firm* — Schwegman Lundberg & Woessner, P.A.

(57) ABSTRACT

An augmented-reality (AR) device comprises a physical sensor and a display. The AR device identifies, using the physical sensor, a location and orientation of the AR device within a physical environment. A selection of a type of a virtual sensor and a placement location of the virtual sensor within the physical environment is received at the AR device. The placement location of the virtual sensor is determined relative to the location and orientation of the AR device within the physical environment. The AR device provides the type of the virtual sensor and the placement location of the virtual sensor to a server that generates virtual content for the virtual sensor. The AR device displays the virtual content at the placement location of the virtual sensor in the display.

20 Claims, 8 Drawing Sheets

(56) References Cited

U.S. PATENT DOCUMENTS

2019/0025583 A1\* 1/2019 Mullins .............. G02B 27/0103
2019/0197719 A1\* 6/2019 Barish ....................... G06T 7/62

\* cited by examiner

AUGMENTED REALITY SENSOR

TECHNICAL FIELD

The subject matter disclosed herein generally relates to the processing of data. Specifically, the present disclosure addresses systems and methods for forming and displaying an augmented-reality sensor.

BACKGROUND

A device can be used to generate and display data in addition to an image captured with the device. For example, augmented reality (AR) is a live, direct or indirect view of a physical, real-world environment whose elements are augmented by computer-generated sensory input such as sound, video, graphics, or Global Positioning System (GPS) data. With the help of advanced AR technology (e.g., adding computer vision and object recognition), the information about the surrounding real world of the user becomes interactive. Device-generated (e.g., artificial) information about the environment and its objects can be overlaid on the real world.

BRIEF DESCRIPTION OF THE DRAWINGS

Some embodiments are illustrated by way of example and not limitation in the figures of the accompanying drawings.

DETAILED DESCRIPTION

Figure 1:
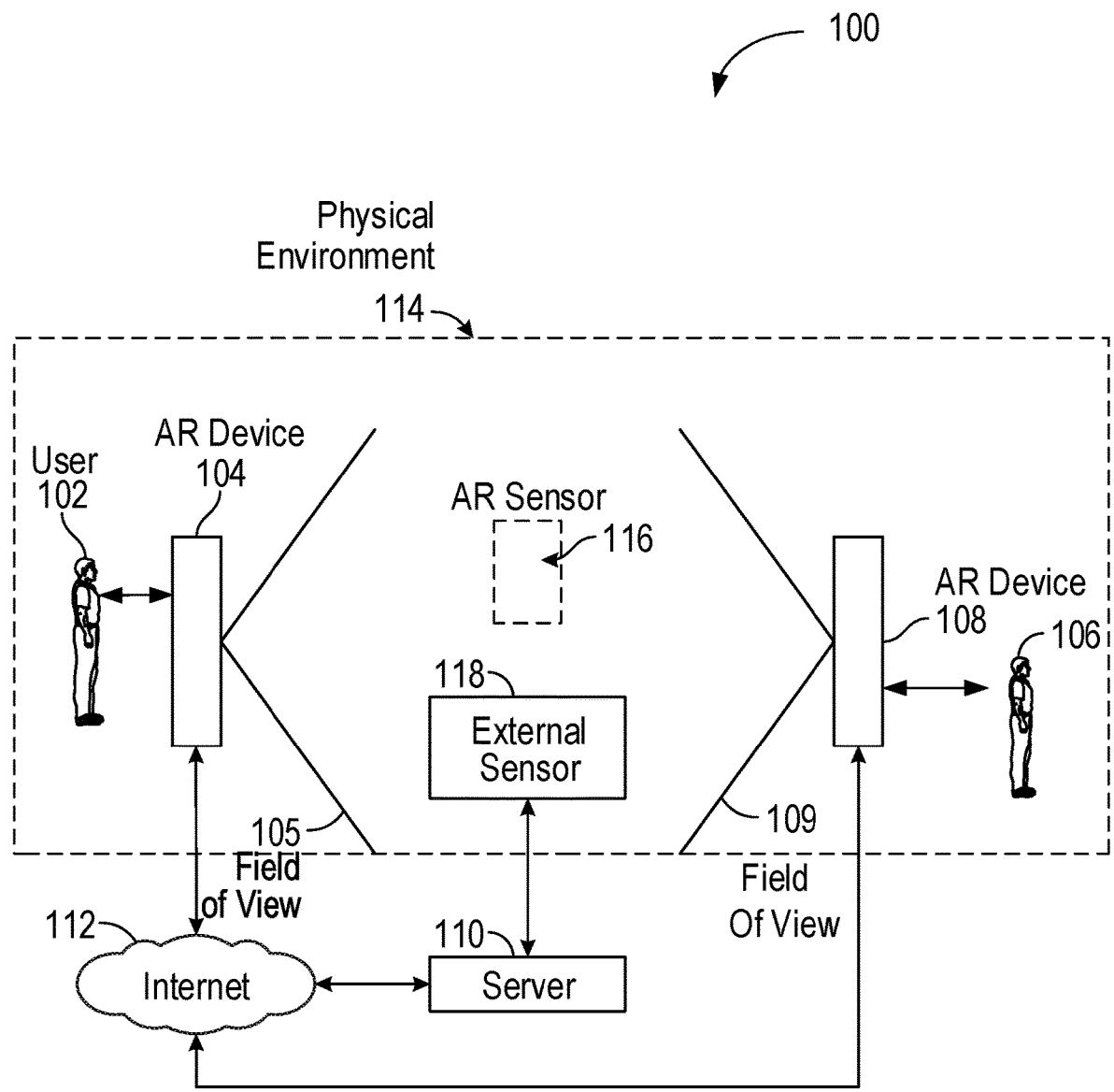
FIG. 1 is a block diagram illustrating an example of a network environment suitable for operating an augmented-reality sensor, according to some example embodiments.

Example methods and systems are directed to an augmented-reality (AR) sensor. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

AR applications allow a user to experience information, such as in the form of a three-dimensional virtual object overlaid on a picture of a physical object captured by a camera of a device (also referred to as an AR device). The physical object may include a visual reference that the AR application can identify. For example, the AR device uses computer vision to detect and identify the physical object. A visualization of the augmented information, such as the three-dimensional virtual object overlaid on or engaged with an image of the physical object, is generated in a display of the device. The three-dimensional virtual object may be selected based on the recognized visual reference or captured image of the physical object. A rendering of the visualization of the three-dimensional virtual object may be based on a position of the display relative to the visual reference.

In one example, the AR device may include a head-wearable device that includes a transparent display. The AR device displays the augmented information in the transparent display such that the user of the AR device perceives the augmented information as an overlay on the physical object.

The present application describes placing an AR sensor (also referred to as a virtual sensor) at a physical location in a physical environment. The AR sensor includes a virtual sensor (e.g., a virtual thermometer, a virtual clock) that does not tangibly exist in the physical environment (e.g., a room) but appears to be part of the physical environment to a user of an AR device (e.g., a head-mounted AR device or a handheld computing device with a display). A user of the AR device may place the AR sensor at a specific location in the physical environment. For example, the user of the AR device selects a virtual thermometer and places it or pins it to a wall in a room. The AR device identifies the pinned location (also referred to as the placement location) and associates the pinned location with the AR sensor.

In one example embodiment, the virtual thermometer accesses sensor data (e.g., temperature data) from a physical sensor inside the AR device, from another physical sensor external to the AR device (e.g., a thermal sensor located in the ceiling of the room), or from another physical sensor in another AR device that is located in the same room or in another room. For example, the AR sensor includes a thermometer that displays a temperature of a server room located in another building. The AR sensor accesses a temperature sensor placed inside the server room or the temperature sensor in another AR device located at the server room. Therefore, a user of the AR device can see the temperature of the server room at a physical location different from the server room (e.g., in a conference room).

In another example, a first user of a first AR device places an AR sensor on a desk in a room. The AR sensor displays the weather forecast. A second user of another AR device walks into the room and sees the AR sensor placed by the first user on the desk in that room. For example, the second user of the other AR device sees a three-dimensional model of a sun floating on the desk.

In one example embodiment, an augmented-reality (AR) device comprises a physical sensor and a display. The AR device identifies, using the physical sensor, a location and orientation of the AR device within a physical environment. A selection of a type of an AR sensor and a placement location of the AR sensor within the physical environment is received at the AR device. The placement location of the AR sensor is determined relative to the location and orientation of the AR device within the physical environment. The AR device provides the type of the AR sensor and the placement location of the AR sensor to a server that generates virtual content for the AR sensor. The AR device displays the virtual content at the placement location of the AR sensor in the display.

In another example embodiment, the server identifies a sensor data source for the AR sensor based on the type and placement location of the AR sensor, receives sensor data from the sensor data source, and generates the AR sensor as coupled to a physical object in the physical environment at the placement location of the AR sensor. The virtual content is generated based on the sensor data from the sensor data source and the type of the AR sensor.

In another example embodiment, the server updates the virtual content based on the sensor data from the sensor data source. The sensor data source includes a combination of a first physical sensor of the AR device, a second physical sensor coupled to the server, a third physical sensor coupled to the physical object at the placement location of the AR sensor, and a fourth physical sensor of another AR device.

In another example embodiment, the AR device displays, in the display, the virtual content as an overlay to the physical object at the placement location of the AR sensor.

In another example embodiment, the physical sensor comprises a combination of a location sensor configured to determine the location of the AR device, an orientation sensor configured to determine the orientation of the AR device, and an attribute sensor configured to measure an attribute related to one of the physical object and the location of the AR device.

In another example embodiment, the AR device accesses first sensor data from the physical sensor of the AR device located at the location of the AR device, receives second sensor data from a second physical sensor external to the AR device, and forms third sensor data based on the first and second sensor data. The virtual content is generated based on the third sensor data.

In another example embodiment, the AR device provides the location and orientation of the AR device to the server; receives second virtual content related to a second AR sensor based on the location and orientation of the AR device, the second virtual content based on second sensor data associated with the second AR sensor; and displays, in the display, the second virtual content as an overlay to a second physical object associated with the location of the second AR sensor.

In another example embodiment, the AR device determines that the location of the AR device is within a predefined distance of a second AR sensor. The second AR sensor is placed by a second AR device. The AR device receives second virtual content related to the second AR sensor in response to determining that the location of the AR device is within the predefined distance of the second AR sensor. The second virtual content is based on second sensor data associated with the second AR sensor. The AR device displays, in the display, the second virtual content as an overlay to a second physical object associated with the location of the second AR sensor.

In another example embodiment, the AR device or the server forms a relational database identifying the AR sensor, the type of the AR sensor, the placement location of the AR sensor, a physical object associated with the placement location of the AR sensor, a sensor data source associated with the type and placement location of the AR sensor and the physical object, and virtual content for the AR sensor based on sensor data from the sensor data source.

In another example embodiment, the AR sensor includes a virtual sensor associated with the selected placement location, the virtual sensor configured to appear as an overlay to a physical object associated with the placement location of the AR sensor within the physical environment.

In another example embodiment, a non-transitory machine-readable storage device may store a set of instructions that, when executed by at least one processor, causes the at least one processor to perform the method operations discussed within the present disclosure.

FIG. 1 is a block diagram illustrating an example of a network environment 100 suitable for operating an augmented-reality sensor, according to some example embodiments. The network environment 100 includes a first AR device 104, a second AR device 108, an external sensor 118 (e.g., a sensor that is not part of the AR devices 104, 108), and a server 110 communicatively coupled to each other via a computer network (e.g., the Internet 112). The AR devices 104, 108 and the external sensor 118 may be part of or located within a physical environment 114 (e.g., a predefined physical space such as a room).

A user 102 of the AR device 104 selects a type of an AR sensor 116 using any type of user-interface means of the AR device 104 (e.g., gesture, object recognition, user input, voice recognition, or gaze input). For example, the user 102 may say a command such as "place a virtual thermometer" to identify the type of the AR sensor 116. Other means of input may be used to select the type of the AR sensor 116. For example, the AR device 104 may display a row of icons identifying different types of available AR sensors (e.g., clock, air pressure, weather, heart rate, or project status) based on the physical environment 114. For instance, icons related to a bathroom-availability AR sensor may be displayed in a conference room. Once the user 102 selects and places the bathroom-availability AR sensor above a whiteboard in the conference room, other users (e.g., a user 106) may also see the virtual content related to the bathroom-availability AR sensor above the same whiteboard. The bathroom-availability AR sensor includes a three-dimensional model of a bathroom stall showing whether the door is open or closed based on sensor data from the bathroom stall associated with the conference room.

The AR device 104 then detects and identifies the placement location of the AR sensor 116 within the physical environment 114. The user 102 can point to a bookshelf in the physical environment 114 to indicate where to place the AR sensor 116. In one example embodiment, the AR device 104 detects that an index finger of the user 102 pauses over a top of the bookshelf to determine and identify the placement location of the AR sensor 116. The AR device 104 includes an optical sensor with a field of view 105. The optical sensor detects the index finger of the user 102 and uses computer vision to determine the placement location of the AR sensor 116 in the physical environment 114 based on the relative position of the index finger of the user 102 within the field of view 105. In another example, the user 102 may use a verbal command to place the AR sensor 116 at a specific location in the physical environment 114. For example, the AR device 104 detects that the user 102 said, "Place a virtual clock on the desk". The AR device 104 uses computer vision to recognize a table or desk within the physical environment 114 and places or pins the virtual clock to the identified table or desk. The AR sensor 116 is pinned to a physical object within the physical environment 114. The pinning or location information of the placement location of the AR sensor 116 may be communicated to the server 110 via the Internet 112 (or, e.g., any other computer network).

The server 110 receives the placement location of the AR sensor 116, the type of the AR sensor 116, and sensor data from the AR device 104 (if the AR sensor 116 relies on sensors from the AR device 104). In another example, the AR device 108 of the user 106 includes an optical sensor with a field of view 109 that captures physical objects in the physical environment 114. The server 110 provides placement information and virtual content information of the AR sensor 116 to the AR device 108 once the server 110 detects that the AR device 108 is located within the physical environment 114. For example, the server 110 accesses sensor data from the external sensor 118 or the AR device 104 to generate the virtual content information (e.g., temperature, pressure) to provide to the AR device 108. Therefore, the user 106 perceives, via the AR device 108, a virtual clock on the desk.

The AR device 108 displays AR information overlaid on top of the table or affixed or coupled to a physical object within the physical environment 114. For example, the user 106 sees a three-dimensional model of a pressure sensor dial displayed on top of a desk telephone through the AR device 108.

In one example embodiment, the AR device 104 includes a wearable computing device (e.g., smart glasses, a smart visor, smart eyewear, a smart helmet, or a smart phone) that the user 102 can wear to see or experience the AR content related to a physical object within the physical environment 114, or other predefined physical objects at a specific geographic location or position in the physical environment 114. FIG. 1 illustrates an example embodiment of the user 102 looking at or through a display of the AR device 104 to view an AR experience (e.g., augmented information) as an overlay to a physical object.

The user 102 may be a user of an AR application executed in the AR device 104 or the server 110. The user 102 may be a human user (e.g., a human being), a machine user (e.g., a computer configured by a software program to interact with the AR device 104), or any suitable combination thereof (e.g., a human assisted by a machine or a machine supervised by a human). The user 102 is not part of the network environment 100, but is associated with the AR device 104.

The AR devices 104, 108 and the server 110 may each be implemented in a computer system, in whole or in part, as described below with respect to FIG. 11.

The server 110 may be part of a network-based system. For example, the network-based system may be or include a cloud-based server system that provides AR content (e.g., AR experiences including three-dimensional (3D) models of virtual objects, animations, images, and video) to the AR devices 104, 108.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 11. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, database, or device, and the functions described herein for any single machine, database, or device may be subdivided among multiple machines, databases, or devices.

The computer network (e.g., the Internet 112) may be any network that enables communication between or among machines (e.g., the server 110), databases, and devices (e.g., the AR devices 104, 108). Accordingly, the computer network may be a wired network, a wireless network (e.g., a mobile or cellular network), or any suitable combination thereof. The computer network may include one or more portions that constitute a private network, a public network (e.g., the Internet), or any suitable combination thereof.

Figure 2:
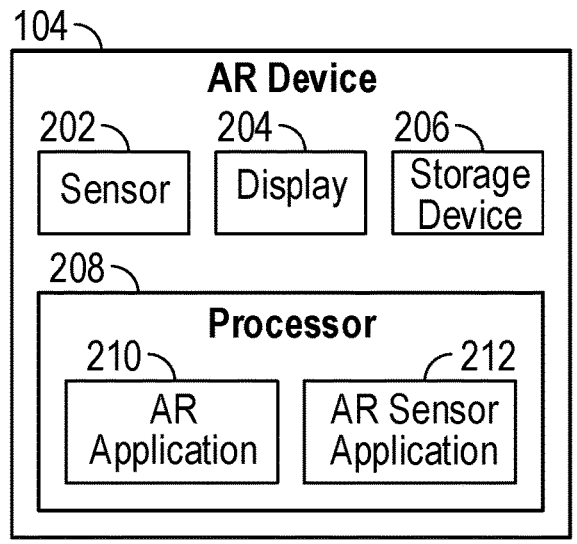
FIG. 2 is a block diagram illustrating modules (e.g., components) of an augmented-reality device, according to some example embodiments.

FIG. 2 is a block diagram illustrating an example embodiment of the AR device 104. The AR device 104 may be a mobile computing device (e.g., a wearable device) that includes sensors 202, a display 204, a storage device 206, and a processor 208. The AR device 104 may include any type of device that can be worn on the head of a user (e.g., the user 102), such as glasses, a headband, a hat, or a visor.

The sensors 202 may be used to generate internal tracking data (e.g., using gyroscope data, accelerometer data, or inertial motion unit data) of the AR device 104 to determine a position and an orientation of the AR device 104. The position and the orientation of the AR device 104 may be used to identify real-world objects in the field of view 105 of the AR device 104. For example, a virtual object may be rendered and displayed in the display 204 when the sensors 202 indicate that the AR device 104 detects or is oriented towards a predefined real-world object (e.g., when the user 102 looks at a table in the physical environment 114 using the AR device 104). In another example, the AR device 104 displays a virtual object (also referred to as augmented information, virtual content, or synthetic content) based on sensor data related to a geographic location of the AR device 104 or the physical environment 114. For example, specific virtual content related to the AR sensor 116 (placed in the physical environment 114) is displayed when the user 102 is home. On the other hand, other virtual content for the same AR sensor 116 is displayed when the user 102 is at work. Therefore, different virtual content for the AR sensor 116 can be configured based on factors including, but not limited to, the geographic location of the AR device 104, sensor data related to the physical environment 114, and the relative position and location of the AR device 104 within the physical environment 114.

Examples of sensors 202 include a camera, an audio sensor, an Inertial Motion Unit (IMU) sensor, a geographic location sensor, a barometer, a humidity sensor, an ambient-light sensor, and a biometric sensor. It is to be noted that the sensors 202 described herein are for illustration purposes. The sensors 202 are thus not limited to the ones described.

The display 204 includes a display surface or lens capable of displaying AR content (e.g., an image of a virtual display or monitor) generated by the processor 208. The display 204 may be transparent so that the user 102 can see through the display 204 (e.g., such as a head-up display).

The storage device 206 stores a library of types of AR sensors, corresponding sensor data source identifications, physical object identifiers, AR content, geographic locations, relative locations and positions, and a profile of the user 102. The AR content includes two- or three-dimensional models of virtual objects with or without corresponding audio. In another example, the storage device 206 may also store a database that identifies reference objects (e.g., visual references or unique identifiers associated with physical objects, such as a book shelf, in the physical environment 114) and corresponding AR content (e.g., animations, 3D virtual objects, or interactive features of the 3D virtual objects).

In one example embodiment, the AR device 104 communicates over the Internet 112 with the server 110 to provide the server 110 with an identification of a type of the AR sensor 116 selected at the AR device 104, the placement location of the AR sensor 116 relative to a location and position of the AR device 104 (or relative to other physical objects within the physical environment 114), and sensor data information related to the AR sensor 116. The server 110 stores the information received from the AR device 104 in a database that further identifies other sensors corresponding or related to the AR sensor 116. For example, the server 110 identifies other temperature sensors from several computers in a server room to determine an overall temperature in the server room.

The processor 208 includes an AR application 210 and an AR sensor application 212. The AR application 210 generates a display of virtual content when the AR device 104 determines the presence of a previously placed (e.g., by the AR device 104 or another AR device 108) AR sensor 116 in the physical environment 114.

The AR sensor application 212 identifies a type of the AR sensor 116 and a placement location of the AR sensor 116 within the physical environment 114. The AR sensor application 212 further generates virtual content based on sensor data from a sensor data source associated with the AR sensor 116. In another embodiment, the AR sensor application 212 detects the presence of a previously placed AR sensor 116 in the physical environment 114. After detecting the presence of the AR sensor 116, the AR sensor application 212 queries the server 110 to identify one or more sensor data sources associated with the AR sensor 116. The AR sensor application 212 retrieves the sensor data from the one or more sensor data sources and generates virtual content based on the retrieved sensor data.

Figure 3:
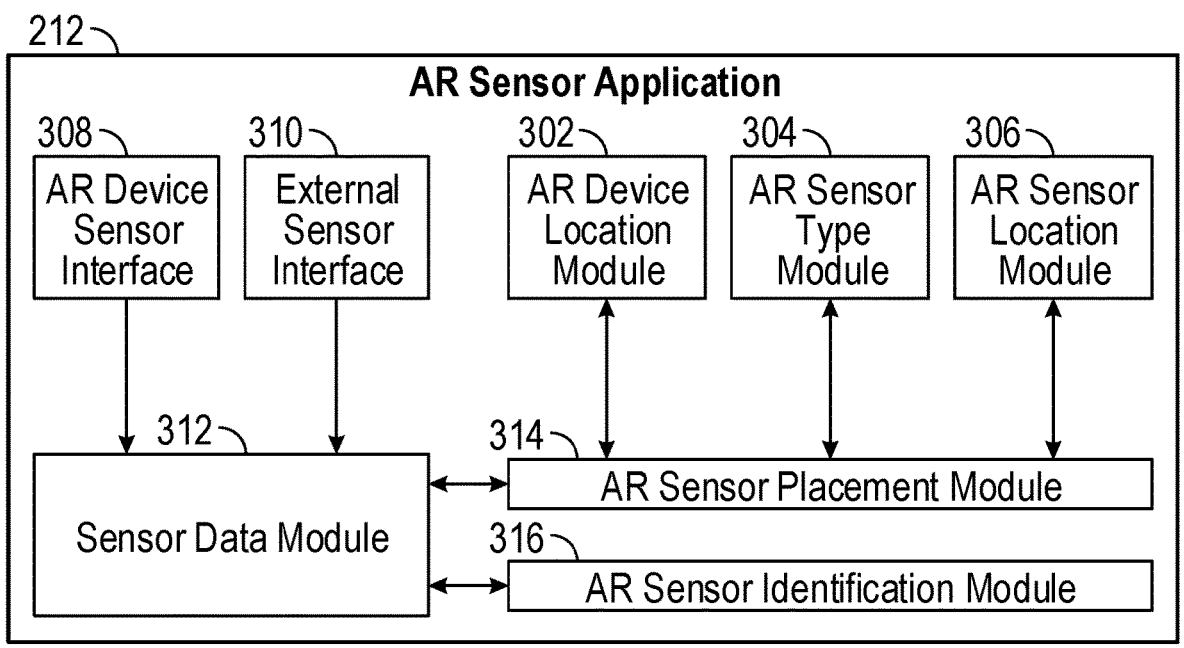
FIG. 3 is a block diagram illustrating modules (e.g., components) of an augmented-reality sensor application, according to some example embodiments.

FIG. 3 is a block diagram illustrating modules (e.g., components) of the AR sensor application 212, according to some example embodiments. The AR sensor application 212 includes an AR device location module 302, an AR sensor type module 304, an AR sensor location module 306, an AR device sensor interface module 308, an external sensor interface module 310, a sensor data module 312, an AR sensor placement module 314, and an AR sensor identification module 316.

The AR device location module 302 detects a position and location of the AR device 104 (e.g., using a GPS unit, an accelerometer, an IMU, computer vision, or a wireless communication signal such as Wi-Fi or Zwave). For example, the AR device location module 302 detects that the AR device 104 is located within the physical environment 114 (e.g., a building, a campus, or any predefined geographic area). In addition, the AR device location module 302 detects the relative position of the AR device 104 within the physical environment 114 (e.g., facing a particular wall in a room).

The AR sensor type module 304 receives an identification of a type of the AR sensor 116 selected by the user 102 of the AR device 104. For example, the AR sensor type module 304 identifies the AR sensor 116 to be a pressure sensor configured to measure the pressure inside a submarine (external to the physical environment 114). In another example, the AR sensor type module 304 identifies the AR sensor 116 to be a temperature sensor configured to measure a temperature of an item (e.g., another user, another room, or a furnace inside the physical environment 114) selected by the user 102.

The AR sensor location module 306 identifies a placement location of the AR sensor 116 based on input from the user 102 as detected by the AR device 104. For example, the AR sensor location module 306 determines that the user 102 wants to place a virtual timer on a desk in the physical environment 114. In another example, the AR sensor location module 306 determines that the user 102 wants to pin a virtual thermometer on a particular wall in the physical environment 114. Therefore, the AR sensor location module 306 pins the AR sensor 116 to a fixed location inside the physical environment 114 (and relative to the physical environment 114). The AR sensor location module 306 may define the placement of the AR sensor 116 relative to a location and position of the AR device 104 in the physical environment 114, relative to other predefined physical objects inside the physical environment 114, relative to other sensor devices in the physical environment 114, or relative to any other geographic reference (e.g., geographic coordinate on Earth). The AR sensor location module 306 may identify the placement location of the AR sensor 116 based on any type of user input from the user 102 (e.g., voice command, touch input via peripheral devices, gesture recognition, or computer vision).

The AR device sensor interface module 308 retrieves sensor data from the sensors 202 of the AR device 104 or from other sensors of other AR devices such as the AR device 108. For example, the AR device sensor interface module 308 accesses temperature data from a thermal sensor located at the AR device 104.

The external sensor interface module 310 interfaces with other sensors to retrieve sensor data from the sensors that are external to the AR device 104 and other AR devices. For example, the external sensor interface module 310 accesses sensor data from the external sensor 118 (e.g., a motion sensor located in the physical environment 114 and connected to the server 110). In another example, the external sensor interface module 310 accesses sensor data from other sensors located outside the physical environment 114.

The sensor data module 312 identifies the sensor source related to the AR sensor 116. For example, a virtual thermometer may be associated with thermal sensors located at different devices within the physical environment 114. The sensor data module 312 identifies the device to query and obtain sensor data from based on the type of the AR sensor 116. In another example, the user 102 may define and identify devices that are to be considered for sensor sources for the AR sensor 116. In one example embodiment, the sensor data module 312 obtains sensor data from the AR device sensor interface module 308 and the external sensor interface module 310.

The AR sensor placement module 314 receives location and position information of the AR device 104 from the AR device location module 302, a selected type of the AR sensor 116 from the AR sensor type module 304, a placement location of the AR sensor 116 from the AR sensor location module 306, and sensor data from the sensor data module 312. In one example embodiment, the AR sensor placement module 314 associates the selected type of the AR sensor 116 with the placement location and a corresponding sensor source. In another example embodiment, the AR sensor 116 is associated with a physical object in the physical environment 114. The AR sensor placement module 314 can further generate virtual content corresponding to the data from the sensor source.

The AR sensor identification module 316 determines whether an AR sensor is present or is associated with the location of the AR device 104 or the physical environment 114. In another example, the AR sensor identification module 316 detects a physical object in the physical environment 114 based on the identification of the physical object (e.g., using computer vision or a wireless communication signal such as Bluetooth or Zwave). Once the AR sensor identification module 316 determines that the AR sensor 116 is present in the physical environment 114, the AR sensor identification module 316 queries the corresponding sensor source (from the sensor data module 312) to access sensor data and form AR content based on the sensor data for the AR sensor 116. For example, the AR sensor identification module 316 accesses sensor data from sensors A, B, and C that are associated with the AR sensor 116 to generate virtual content (e.g., a color based on the combined sensor data) for the AR sensor 116.

Figure 4:
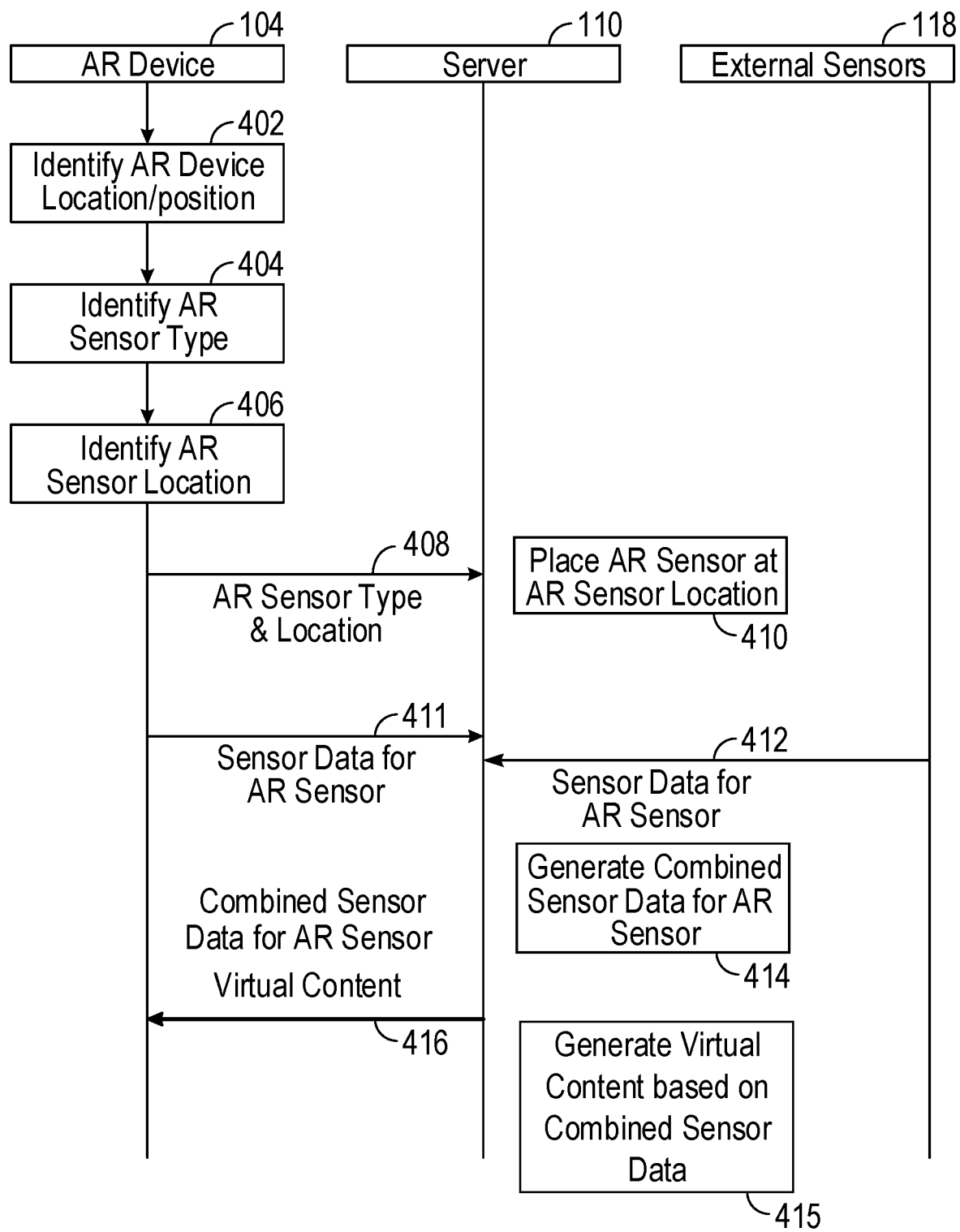
FIG. 4 is a block diagram illustrating interactions among an augmented-reality device, a server, and external sensors, according to some example embodiments.

FIG. 4 is a block diagram illustrating interactions among the AR device 104, the server 110, and the external sensors 118, according to some example embodiments. At operation 402, the AR device 104 identifies a location and position of the AR device 104. At operation 404, the AR device 104 identifies a type of AR sensor selected by the user 102. At operation 406, the AR device 104 identifies a placement location of the AR sensor within the physical environment 114. At operation 408, the AR device 104 communicates the selected type of AR sensor and the placement location of the AR sensor for the AR sensor to the server 110. At operation 410, the server 110 places the AR sensor at the placement location identified at operation 406. In one example embodiment, the server 110 associates the AR sensor with a physical object at the placement location. At operation 411, the server 110 receives sensor data from a physical sensor in the AR device (the physical sensor being associated with the AR sensor). At operation 412, the server 110 retrieves sensor data from the external sensors 118 (the external sensors 118 being associated with the AR sensor). At operation 414, the server 110 generates combined sensor data for the AR sensor and generates virtual content based on the combined sensor data at operation 415. At operation 416, the server 110 communicates the combined sensor data along with the virtual content for the AR sensor to the AR device 104.

Figure 5:
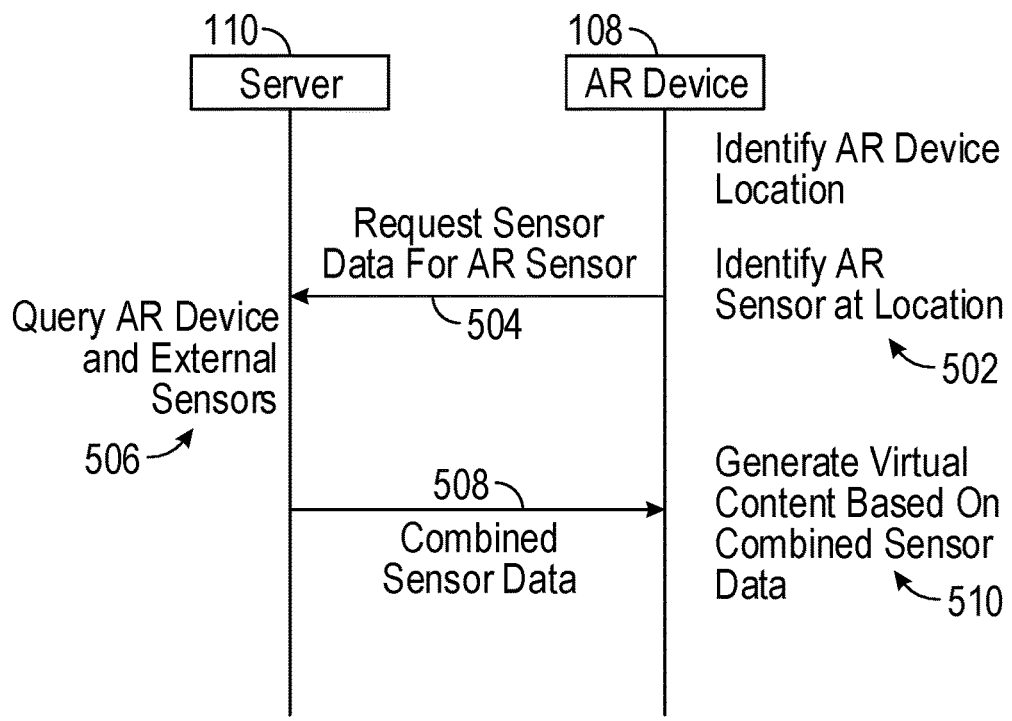
FIG. 5 is a block diagram illustrating interactions between an augmented-reality device and a server, according to some example embodiments.

FIG. 5 is a block diagram illustrating interactions between the server 110 and the AR device 108, according to some example embodiments. At operation 502, the AR device 108 identifies a position and orientation of the AR device 108 and determines the placement location of the AR sensor. For example, the AR device 108 determines the presence of the AR sensor based on the position and orientation of the AR device 108. At operation 504, the AR device 108 requests sensor data associated with the AR sensor from the server 110. At operation 506, the server 110 queries sensors from the sensor data source associated with the AR sensor. For example, the server 110 queries sensor data from the AR device 108 and the external sensor 118. At operation 508, the server 110 sends the combined sensor data to the AR device 108. At operation 510, the AR device 108 generates virtual content for the AR sensor based on the combined sensor data received from the server 110.

Figure 6:
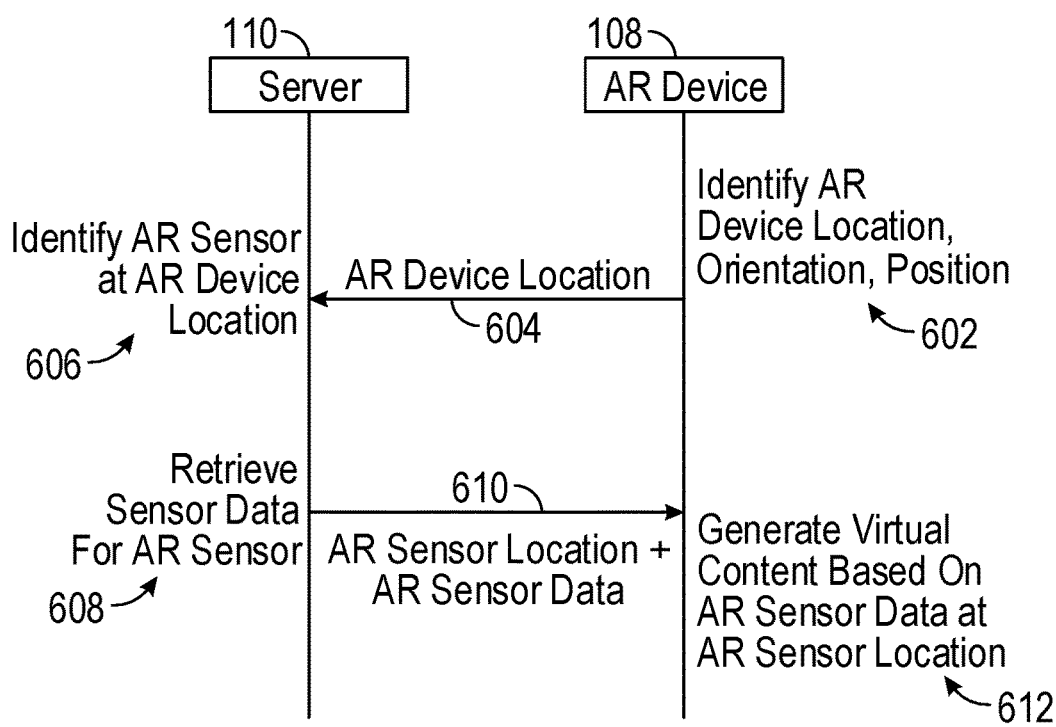
FIG. 6 is a block diagram illustrating interactions between an augmented-reality device and a server, according to some example embodiments.

FIG. 6 is a block diagram illustrating interactions between the server 110 and the AR device 108, according to some example embodiments. At operation 602, the AR device 108 detects the location, orientation, and position of the AR device 108. At operation 604, the AR device 108 sends the location, orientation, and position information to the server 110. At operation 606, the server 110 identifies an AR sensor associated with the location, orientation, and position of the AR device 108. For example, the server 110 determines that an AR sensor is within a preset distance of the AR device 108 or within a predefined distance of the location, orientation, and position of the AR device 108. In another example, the server 110 determines that an AR sensor is present and associated with a physical object that is located within a predefined distance of the location, orientation, and position of the AR device 108.

At operation 608, the server 110 retrieves sensor data associated with the AR sensor from the corresponding sensor data source. At operation 610, the server 110 sends placement location information of the AR sensor (e.g., relative to a physical object in the physical environment 114) and the sensor data to the AR device 108. At operation 612, the AR device 108 generates and displays virtual content based on the AR sensor data for the AR sensor located at the placement location. The virtual content appears to the user 106 as part of the physical environment 114.

Figure 7:
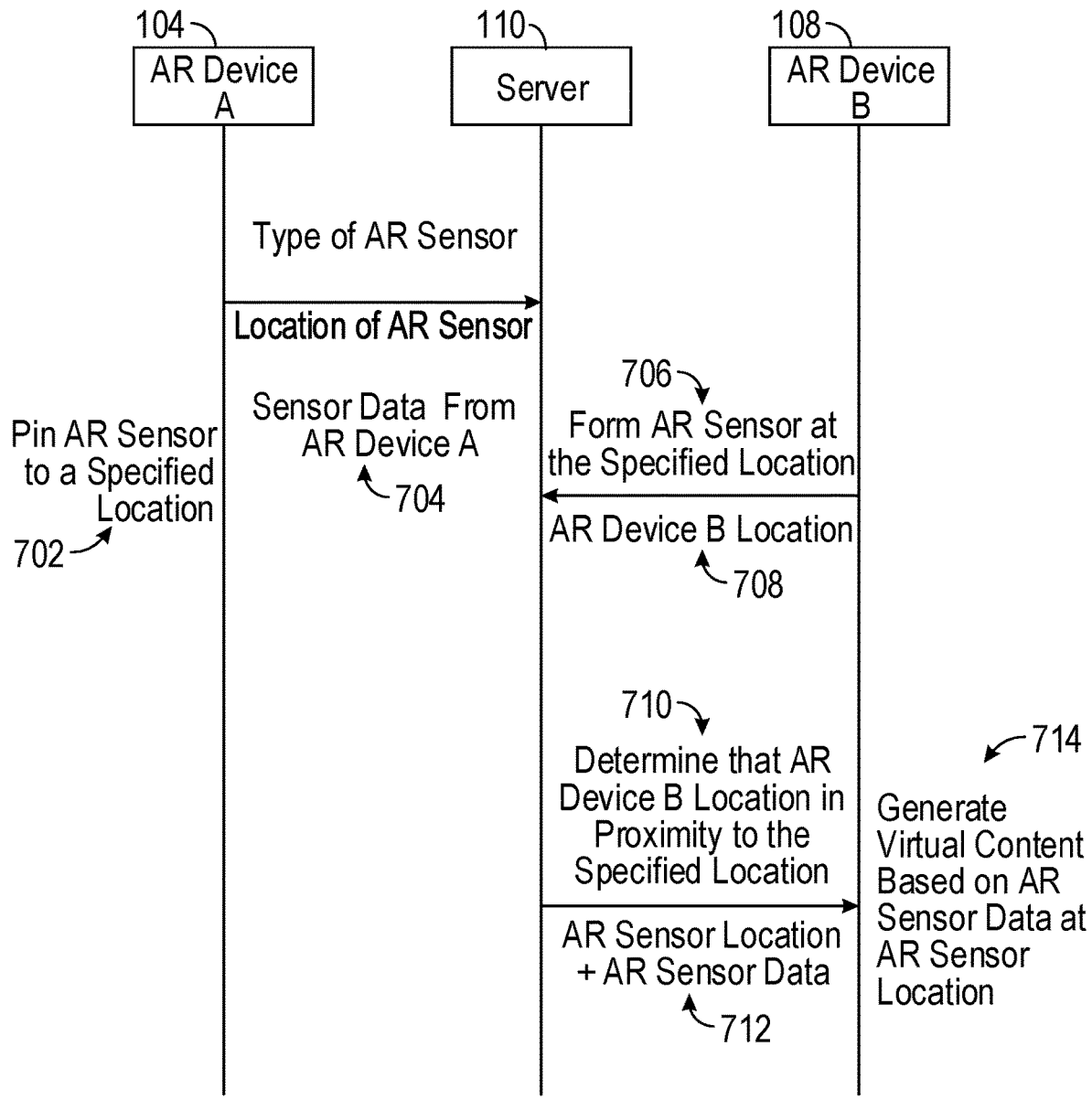
FIG. 7 is a block diagram illustrating interactions among a first augmented-reality device, a server, and a second augmented-reality device, according to some example embodiments.

FIG. 7 is a block diagram illustrating interactions among the AR device 104, the server 110, and the AR device 108, according to some example embodiments. At operation 702, the user 102 of the AR device 104 pins an AR sensor to a specified location or physical object (e.g., pinning a virtual object to a wall of a room). At operation 704, the AR device 104 sends to the server 110 information identifying the selected type of AR sensor, the placement location of the AR sensor, sensor data for the AR sensor (e.g., sensor data from the AR device 104). At operation 706, the server 110 places the AR sensor at the placement location. At operation 708, the server 110 receives a location of the AR device 108. At operation 710, the server 110 determines that the AR device 108 is in proximity to (or within a predefined distance of) the placement location of the AR sensor. At operation 712, the server 110 sends to the AR device 108 information identifying the placement location of the AR sensor, and the sensor data associated with the AR sensor. At operation 714, the AR device 108 generates virtual content based on the received sensor data for the AR sensor. The AR device 108 renders the virtual content in a display of the AR device 108. The virtual content appears at the placement location of the AR sensor.

Figure 8:
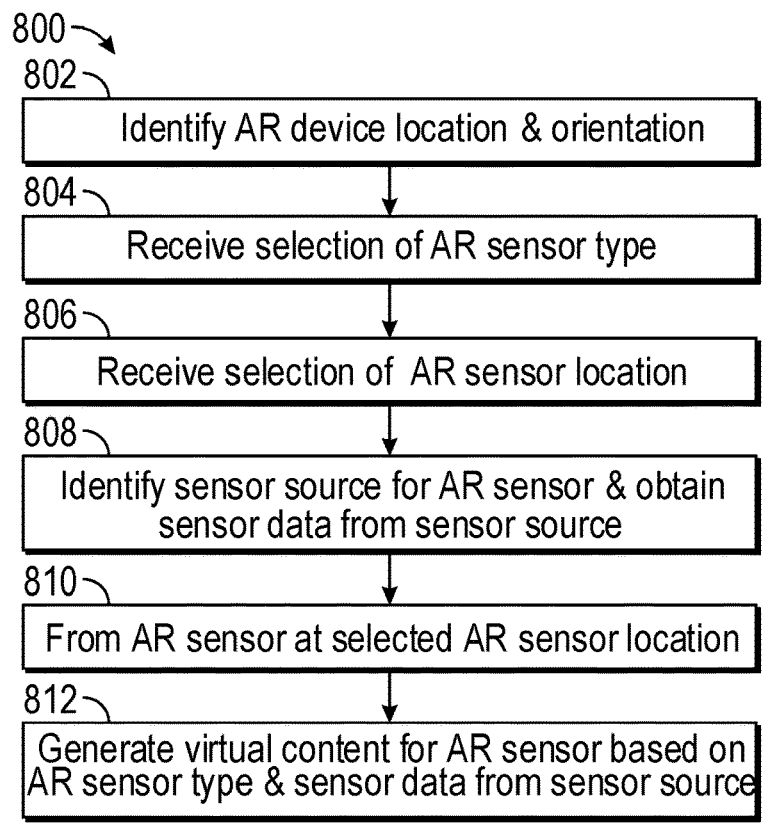
FIG. 8 is a flowchart illustrating an example operation of an augmented-reality sensor application, according to some example embodiments.

FIG. 8 is a flowchart illustrating an example operation 800 of the AR sensor application 212, according to some example embodiments. At operation 802, the AR device 104 identifies its location and orientation (and position). In one example embodiment, operation 802 may be implemented using the AR device location module 302.

At operation 804, the AR device 104 receives a selection of a type of AR sensor from the user 102. In one example embodiment, operation 804 may be implemented using the AR sensor type module 304.

At operation 806, the AR device 104 receives an identification of a placement location of the AR sensor from the user 102. In one example embodiment, operation 806 may be implemented using the AR sensor location module 306.

At operation 808, the AR device 104 identifies a sensor source for the AR sensor and obtains sensor data from the sensor source. In one example embodiment, operation 808 may be implemented using the sensor data module 312.

At operation 810, the AR device 104 forms the AR sensor at the placement location. In one example embodiment, operation 810 may be implemented using the AR sensor placement module 314.

At operation 812, the AR device 104 generates virtual content for the AR sensor based on the AR sensor type and the sensor data from the sensor source. In one example embodiment, operation 812 may be implemented using the AR sensor identification module 316.

Figure 9:
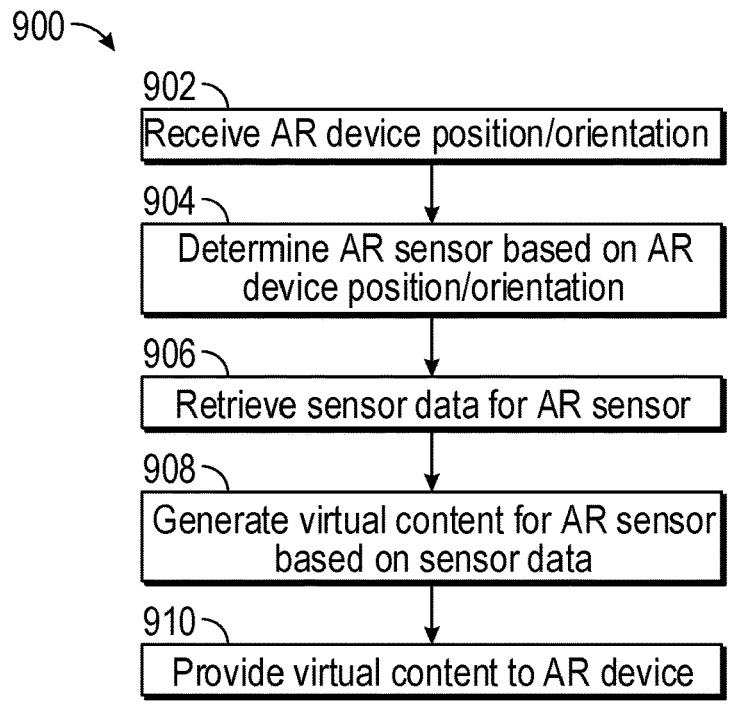
FIG. 9 is a flowchart illustrating another example operation of an augmented-reality sensor application, according to some example embodiments.

FIG. 9 is a flowchart illustrating another example operation 900 of an AR sensor application at a server, according to some example embodiments. At operation 902, the server 110 receives information from the AR device 104 identifying the position and orientation of the AR device 104. At operation 904, the server 110 identifies an AR sensor based on the location and orientation of the AR device 104. At operation 906, the server 110 retrieves sensor data from a sensor source associated with the AR sensor. At operation 908, the server 110 generates virtual content for the AR sensor based on the sensor data. At operation 910, the server 110 provides the virtual content to the AR device 104.

Figure 10:
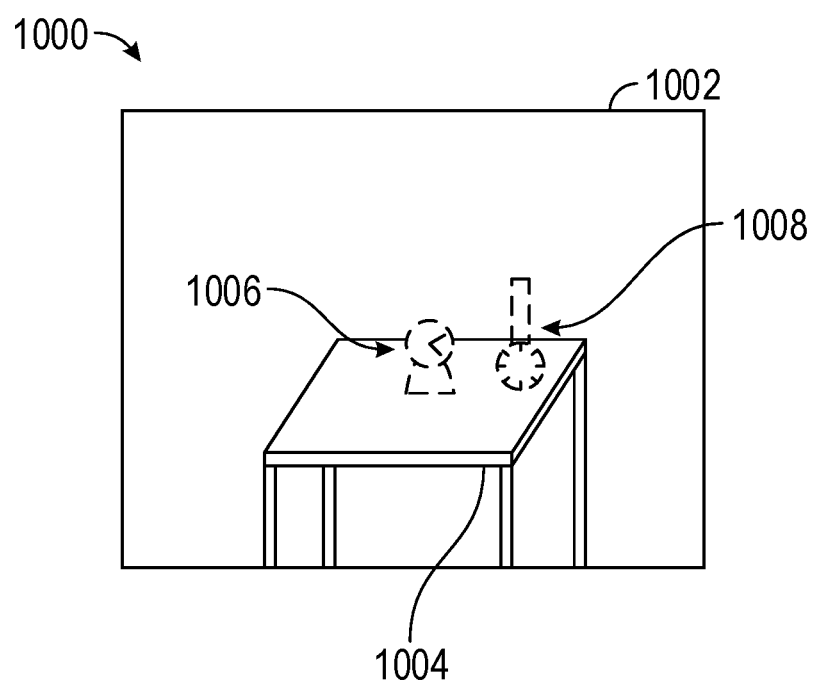
FIG. 10 is a block diagram illustrating an example of a display of an augmented-reality device, according to some example embodiments.

FIG. 10 is a block diagram illustrating an example 1000 of a display 1002 of an AR device. The display 1002 displays AR content (e.g., a virtual clock 1006 and a virtual thermometer 1008) overlaid on a real-world physical object (e.g., a table 1004). The virtual clock 1006 displays the time based on sensor data from a corresponding data source (e.g., the server 110). The virtual thermometer 1008 displays a visualization of a temperature based on temperature data from another AR device. Both the virtual clock 1006 and the virtual thermometer 1008 have been placed by the user 102 of the AR device 104. The user 106 of the AR device 108 sees both the virtual clock 1006 and the virtual thermometer 1008 on the table 1004. In other words, a first AR device can pin and place a virtual sensor onto a physical location where the sensor data from the virtual sensor does not depend on sensors from the first AR device. A second AR device will be able to see the virtual sensor placed by the first AR device.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between or among such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network and via one or more appropriate interfaces (e.g., application programming interfaces (APIs)).

Electronic Apparatus and System

Example embodiments may be implemented in digital electronic circuitry, in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer, or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special-purpose logic circuitry (e.g., an FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 11:
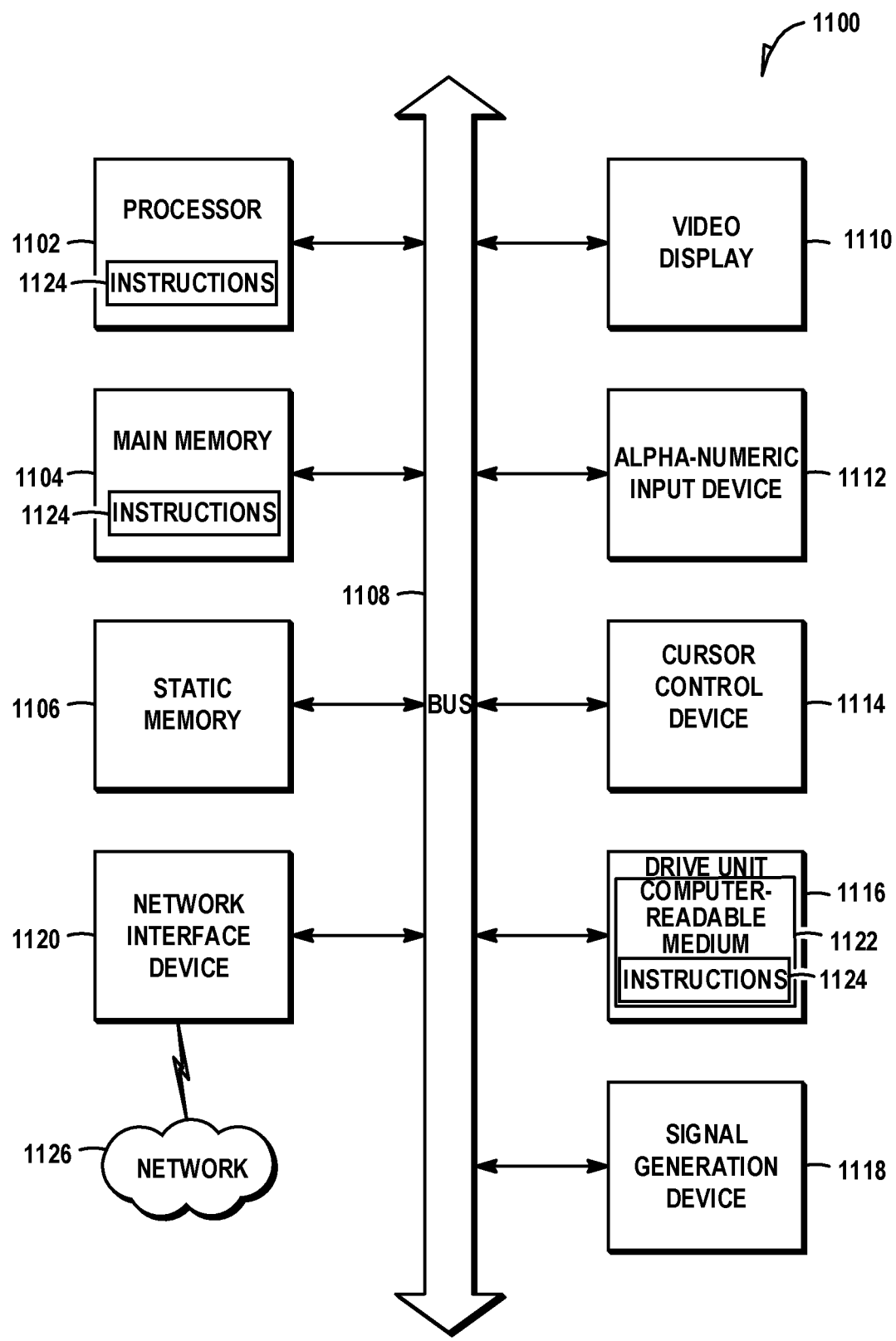
FIG. 11 is a block diagram illustrating components of a machine, according to some example embodiments, able to read instructions from a machine-readable medium and perform any one or more of the methodologies discussed herein.

FIG. 11 is a block diagram of a machine in the example form of a computer system 1100 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a network switch, a network bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU), or both), a main memory 1104, and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a user interface (UI) navigation (or cursor control) device 1114 (e.g., a mouse), a disk drive unit 1116, a signal generation device 1118 (e.g., a speaker), and a network interface device 1120.

Machine-Readable Medium

The disk drive unit 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104 and/or within the processor 1102 during execution thereof by the computer system 1100, the main memory 1104 and the processor 1102 also constituting machine-readable media. The instructions 1124 may also reside, completely or at least partially, within the static memory 1106.

While the machine-readable medium 1122 is shown in an example embodiment to be a single medium, the term "machine-readable medium" may include a single medium or multiple media (e.g., a centralized or distributed database, and/or associated caches and servers) that store the one or more instructions 1124 or data structures. The term "machine-readable medium" shall also be taken to include any tangible medium that is capable of storing, encoding, or carrying instructions for execution by the machine and that cause the machine to perform any one or more of the methodologies of the present embodiments, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1124 may further be transmitted or received over a communications network 1126 using a transmission medium. The instructions 1124 may be transmitted using the network interface device 1120 and any one of a number of well-known transfer protocols (e.g., hypertext transfer protocol (HTTP)). Examples of communication networks include a local-area network (LAN), a wide-area network (WAN), the Internet, mobile telephone networks, plain old telephone service (POTS) networks, and wireless data networks (e.g., Wi-Fi and WiMAX networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An augmented-reality (AR) device comprising:
   one or more hardware processors; and
   a memory storing an AR application that, when executed by the one or more hardware processors, causes the AR device to perform operations comprising:
      receiving a first input selecting a first type of physical sensor to be presented as a virtual sensor, the first type of physical sensor having been selected from a plurality of types of physical sensors and being configured to present a first type of sensor data, wherein a second type of physical sensor from the plurality of types of physical sensors is configured to present a second type of sensor data that is different than the first type of sensor data;
      receiving a second input selecting a first physical sensor as a data source for the virtual sensor, the first physical sensor being located at a first geographic location within a physical environment and configured to capture the first type of sensor data;
      receiving a third input selecting a placement location of the virtual sensor, the placement location being a second geographic location within the physical environment that is different than the first geographic location;
      transmitting a request to a remote server to generate virtual content based on the first type of physical sensor to be presented as the virtual sensor, the data source for the virtual sensor, and the placement location of the virtual sensor;
      after transmitting the request to the remote server, monitoring a current geographic location of the AR device in relation to the second geographic location that was selected as the placement location of the virtual sensor;
      in response to determining that the current geographic location of the AR device is within a threshold distance of the second geographic location, transmitting a notification to the remote server to provide the virtual content for the virtual sensor;
      receiving, the virtual content from the remote server, the remote server having generated the virtual content based on sensor data gathered from the first physical sensor selected as the data source; and
      presenting the virtual content on a transparent display of the AR device, the virtual content being a virtual representation of a physical sensor of the first type, a position at which the virtual content is presented on the transparent display being based on the placement location of the virtual sensor such that the virtual representation of the physical sensor appears to be located at the second geographic location in the physical environment to a user viewing the second geographic location through the transparent display, wherein the virtual representation of the physical sensor displays an output representing the sensor data gathered from the first physical sensor located at the first geographic location in the physical environment.

2. The AR device of claim 1, the operations further comprising:
   receiving updated virtual content from the remote server, the updated virtual content generated by the remote server based on updated sensor data gathered from the first physical sensor selected as the data source; and presenting the updated virtual content on a transparent display of the AR device.

3. The AR device of claim 1, the operations further comprising:

receiving a third input selecting a second physical sensor as a second data source for the virtual sensor, the second physical sensor being located at a third geographic location within the physical environment, wherein the virtual content generated by the remote server is generated based on the sensor data gathered from the first physical sensor and sensor data gathered form the second physical sensor.

4. The AR device of claim 1, the operations further comprising:

receiving, from the remote server, second virtual content related to a second virtual sensor, the second virtual content generated by remote server based on the second type of physical sensor, a second data source, and a second placement location provided to the remote server by a second AR device.

5. The AR device of claim 4, the operation further comprising:

presenting the second virtual content on the transparent display of the AR device, the second virtual content being a virtual representation of a physical sensor of the second type, a position at which the second virtual content is presented on the transparent display being based on the second placement location of the second virtual sensor such that the virtual representation of the physical sensor of the second type appears to be located at a third geographic location in the physical environment to the user viewing the third geographic location through the transparent display.

6. The AR device of claim 1, wherein the first type of physical sensor is a thermometer, the first type of sensor data is temperature data, and the virtual representation of the physical sensor is a virtual representation of the thermometer presenting temperature data.

7. The AR device of claim 6, wherein the first physical sensor is first thermometer physically located at the second geographic location.

8. A method comprising:

receiving, by an augmented-reality (AR) device, a first input selecting a first type of physical sensor to be presented as a virtual sensor, the first type of physical sensor having been selected from a plurality of types of physical sensors and being configured to present a first type of sensor data, wherein a second type of physical sensor from the plurality of types of physical sensors is configured to present a second type of sensor data that is different than the first type of sensor data;

receiving a second input selecting a first physical sensor as a data source for the virtual sensor, the first physical sensor being located at a first geographic location within a physical environment and configured to capture the first type of sensor data;

receiving a third input selecting a placement location of the virtual sensor, the placement location being a second geographic location within the physical environment that is different than the first geographic location;

transmitting a request to a remote server to generate virtual content based on the first type of physical sensor to be presented as the virtual sensor, the data source for the virtual sensor, and the placement location of the virtual sensor;

after transmitting the request to the remote server, monitoring a current geographic location of the AR device in relation to the second geographic location that was selected as the placement location of the virtual sensor;

in response to determining that the current geographic location of the AR device is within a threshold distance of the second geographic location, transmitting a notification to the remote server to provide the virtual content for the virtual sensor;

receiving, the virtual content from the remote server, the remote server having generated the virtual content based on sensor data gathered from the first physical sensor selected as the data source; and presenting the virtual content on a transparent display of the AR device, the virtual content being a virtual representation of a physical sensor of the first type, a position at which the virtual content is presented on the transparent display being based on the placement location of the virtual sensor such that the virtual representation of the physical sensor appears to be located at the second geographic location in the physical environment to a user viewing the second geographic location through the transparent display, wherein the virtual representation of the physical sensor displays an output representing the sensor data gathered from the first physical sensor located at the first geographic location in the physical environment.

9. The method of claim 8, further comprising:

receiving updated virtual content from the remote server, the updated virtual content generated by the remote server based on updated sensor data gathered from the first physical sensor selected as the data source; and presenting the updated virtual content on a transparent display of the AR device.

10. The method of claim 8, further comprising:

receiving a third input selecting a second physical sensor as a second data source for the virtual sensor, the second physical sensor being located at a third geographic location within the physical environment, wherein the virtual content generated by the remote server is generated based on the sensor data gathered from the first physical sensor and sensor data gathered form the second physical sensor.

11. The method of claim 8, further comprising:

receiving, from the remote server, second virtual content related to a second virtual sensor, the second virtual content generated by remote server based on the second type of physical sensor, a second data source, and a second placement location provided to the remote server by a second AR device.

12. The method of claim 11, further comprising:

presenting the second virtual content on the transparent display of the AR device, the second virtual content being a virtual representation of a physical sensor of the second type, a position at which the second virtual content is presented on the transparent display being based on the second placement location of the second virtual sensor such that the virtual representation of the physical sensor of the second type appears to be located at a third geographic location in the physical environment to the user viewing the third geographic location through the transparent display.

13. The method of claim 8, wherein the first type of physical sensor is a thermometer, the first type of sensor data is temperature data, and the virtual representation of the physical sensor is a virtual representation of the thermometer presenting temperature data.

14. The method of claim 13, wherein the first physical sensor is a first thermometer physically located at the second geographic location.

15. A non-transitory computer-readable medium storing instructions that, when executed by one or more computer processors of an augmented-reality (AR) device, cause the AR device to perform operations comprising:
  receiving a first input selecting a first type of physical sensor to be presented as a virtual sensor, the first type of physical sensor having been selected from a plurality of types of physical sensors and being configured to present a first type of sensor data, wherein a second type of physical sensor from the plurality of types of physical sensors is configured to present a second type of sensor data that is different than the first type of sensor data;
  receiving a second input selecting a first physical sensor as a data source for the virtual sensor, the first physical sensor being located at a first geographic location within a physical environment and configured to capture the first type of sensor data;
  receiving a third input selecting a placement location of the virtual sensor, the placement location being a second geographic location within the physical environment that is different than the first geographic location;
  transmitting a request to a remote server to generate virtual content based on the first type of physical sensor to be presented as the virtual sensor, the data source for the virtual sensor, and the placement location of the virtual sensor;
  after transmitting the request to the remote server, monitoring a current geographic location of the AR device in relation to the second geographic location that was selected as the placement location of the virtual sensor;
  in response to determining that the current geographic location of the AR device is within a threshold distance of the second geographic location, transmitting a notification to the remote server to provide the virtual content for the virtual sensor;
  receiving, the virtual content from the remote server, the remote server having generated the virtual content based on sensor data gathered from the first physical sensor selected as the data source; and
  presenting the virtual content on a transparent display of the AR device, the virtual content being a virtual representation of a physical sensor of the first type, a position at which the virtual content is presented on the transparent display being based on the placement location of the virtual sensor such that the virtual representation of the physical sensor appears to be located at the second geographic location in the physical environment to a user viewing the second geographic location through the transparent display, wherein the virtual representation of the physical sensor displays an output representing the sensor data gathered from the first physical sensor located at the first geographic location in the physical environment.

16. The non-transitory computer-readable medium of claim 15, the operations further comprising:
  receiving updated virtual content from the remote server, the updated virtual content generated by the remote server based on updated sensor data gathered from the first physical sensor selected as the data source; and
  presenting the updated virtual content on a transparent display of the AR device.

17. The non-transitory computer-readable medium of claim 15, the operations further comprising:
  receiving a third input selecting a second physical sensor as a second data source for the virtual sensor, the second physical sensor being located at a third geographic location within the physical environment, wherein the virtual content generated by the remote server is generated based on the sensor data gathered from the first physical sensor and sensor data gathered form the second physical sensor.

18. The non-transitory computer-readable medium of claim 15, the operations further comprising:
  receiving, from the remote server, second virtual content related to a second virtual sensor, the second virtual content generated by remote server based on the second type of physical sensor, a second data source, and a second placement location provided to the remote server by a second AR device.

19. The non-transitory computer-readable medium of claim 18, the operations further comprising:
  presenting the second virtual content on the transparent display of the AR device, the second virtual content being a virtual representation of a physical sensor of the second type, a position at which the second virtual content is presented on the transparent display being based on the second placement location of the second virtual sensor such that the virtual representation of the physical sensor of the second type appears to be located at a third geographic location in the physical environment to the user viewing the third geographic location through the transparent display.

20. The non-transitory computer-readable medium of claim 15, wherein the first type of physical sensor is a thermometer, the first type of sensor data is temperature data, the virtual representation of the physical sensor is a virtual representation of the thermometer presenting temperature data, and the first physical sensor is a first thermometer physically located at the second geographic location.

* * * * *